(12) United States Patent
Komori et al.

(10) Patent No.: US 11,328,632 B2
(45) Date of Patent: May 10, 2022

(54) DISPLAY CONTROL APPARATUS, CONTROL METHOD OF DISPLAY CONTROL APPARATUS, MOVING OBJECT, AND STORAGE MEDIUM FOR CONTROLLING VISIBLE DIRECTION IN DISPLAY DEVICE

(71) Applicant: HONDA MOTOR CO., LTD., Tokyo (JP)

(72) Inventors: Kenji Komori, Wako (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/134,592

(22) Filed: Dec. 28, 2020

(65) Prior Publication Data
US 2021/0225214 A1 Jul. 22, 2021

(30) Foreign Application Priority Data
Jan. 16, 2020 (JP) .............................. JP2020-005392

(51) Int. Cl.
| G09F 21/04 | (2006.01) |
| G09F 9/30 | (2006.01) |
| B60Q 1/50 | (2006.01) |
| G06F 3/14 | (2006.01) |

(52) U.S. Cl.
CPC ............. *G09F 21/04* (2013.01); *B60Q 1/503* (2013.01); *G06F 3/1423* (2013.01); *G09F 9/30* (2013.01)

(58) Field of Classification Search
CPC ........ G06F 3/1423; G06F 3/147; G09F 21/04; G09F 9/30; B60Q 1/503
See application file for complete search history.

(56) References Cited

U.S. PATENT DOCUMENTS

| 6,018,697 | A | * | 1/2000 | Morimoto | .......... | G01C 21/3655 |
| | | | | | | 701/411 |
| 10,311,770 | B2 | | 6/2019 | Ishizuka et al. | | |
| 10,818,214 | B2 | | 10/2020 | Ishizuka et al. | | |
| 2016/0203582 | A1 | * | 7/2016 | Nakai | ................ | G02B 27/0179 |
| | | | | | | 345/632 |
| 2017/0229053 | A1 | | 8/2017 | Ishizuka et al. | | |
| 2018/0003965 | A1 | * | 1/2018 | O'Toole | ............ | G02B 27/0101 |
| 2020/0012097 | A1 | * | 1/2020 | Kubota | .................... | G09G 5/38 |
| 2020/0312213 | A1 | | 10/2020 | Ishizuka et al. | | |
| 2021/0165220 | A1 | * | 6/2021 | Nakada | .................... | G09G 5/38 |

FOREIGN PATENT DOCUMENTS

| JP | 2017140929 A | 8/2017 |
| JP | 2018165762 A | 10/2018 |

* cited by examiner

*Primary Examiner* — Muhammad N Edun
(74) *Attorney, Agent, or Firm* — Thomas | Horstemeyer, LLP

(57) ABSTRACT

A display control apparatus comprises a display device that is a display device to be provided in a moving object that can travel, and outputs image information such that a visible direction from the outside of the moving object is restricted. The display control apparatus detects an image information presentation target that is present around the moving object, and controls the visible direction in the display device to a predetermined direction. The display control apparatus controls the predetermined direction such that an output of the display device is visible to the detected image information presentation target.

16 Claims, 8 Drawing Sheets

FIG. 2
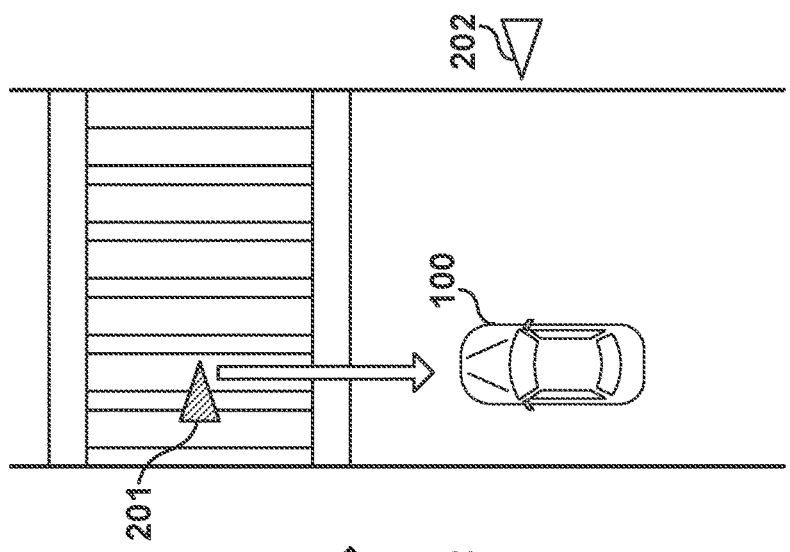
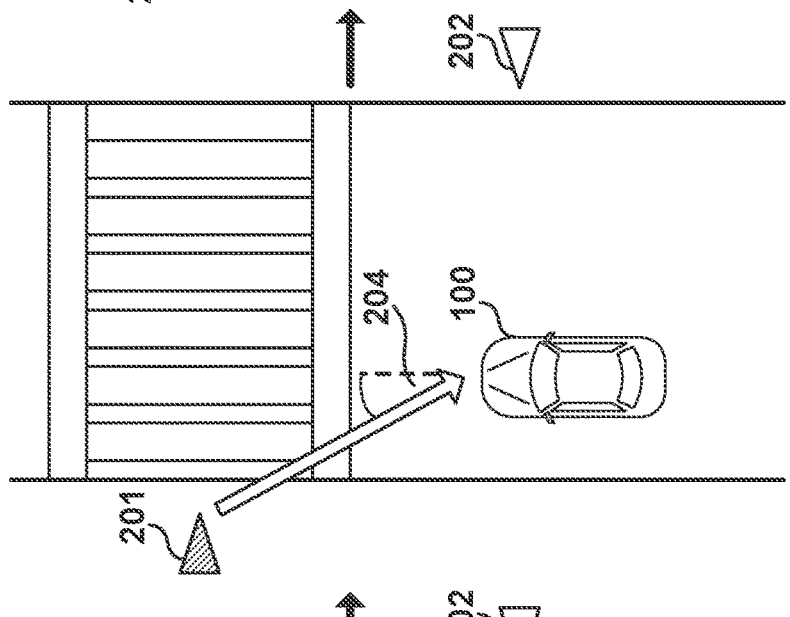
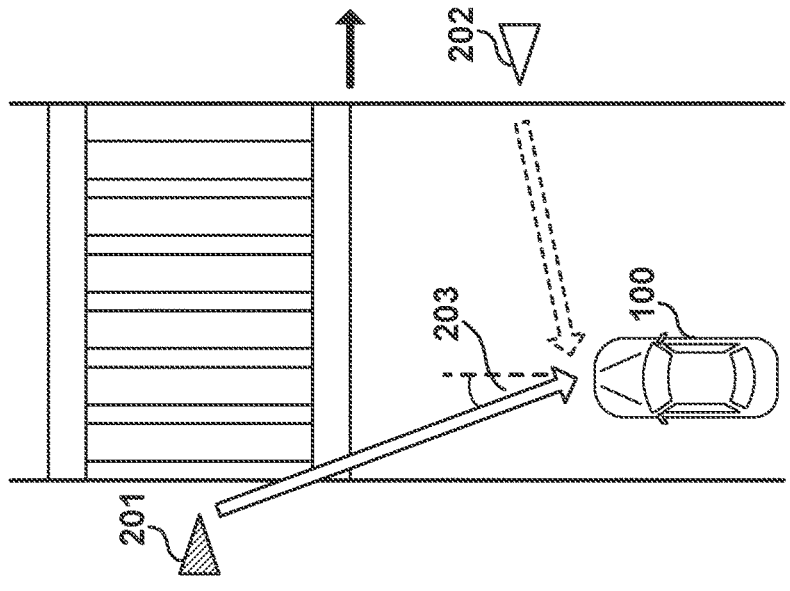

FIG. 8

| TYPE OF IMAGE INFORMATION PRESENTATION TARGET | STATE OF IMAGE INFORMATION PRESENTATION TARGET | DISPLAY INFORMATION |
|---|---|---|
| PEDESTRIAN | IN WAITING STATE OF PASSING PEDESTRIAN CROSSING | STOPPED. ABLE TO PASS |
| PEDESTRIAN | IN STATE OF PASSING PEDESTRIAN CROSSING | TAKE CARE |
| VEHICLE | IN WAITING STATE OF PASSING INTERSECTION | I HAVE STOPPED. I YIELD THE RIGHT OF WAY TO YOU. |
| VEHICLE | PASSING THROUGH INTERSECTION STATE | (NO DISPLAY) |

DISPLAY CONTROL APPARATUS, CONTROL METHOD OF DISPLAY CONTROL APPARATUS, MOVING OBJECT, AND STORAGE MEDIUM FOR CONTROLLING VISIBLE DIRECTION IN DISPLAY DEVICE

CROSS-REFERENCE TO RELATED APPLICATION(S)

This application claims priority to and the benefit of Japanese Patent Application No. 2020-005392 filed on Jan. 16, 2020, the entire disclosure of which is incorporated herein by reference.

BACKGROUND OF THE INVENTION

Field of the Invention

The present invention relates to a display control apparatus, a control method of the display control apparatus, a moving object, and a storage medium for controlling visible direction in a display device.

Description of the Related Art

Heretofore, when a driver of a moving object such as a vehicle yields the right of way to others, the driver makes a simple performance for indicating his/her intention by a gesture or the like to a pedestrian or a driver of another moving object that are present outside the vehicle. Meanwhile, as the traveling of a moving object is being automated, there are cases where the driver, although being in a space of the moving object, is disengaged from the operation of the moving object.

A technique has been proposed in which instead of a driver making a performance for indicating his/her intention, information is displayed in a display device of the moving object. That is, a technique has been proposed in which, a display device that is visible to a pedestrian or a driver of another moving object that are present outside the vehicle is provided, and information is presented to the pedestrian or the driver of the other moving object (Japanese Patent Laid-Open No. 2017-140929, Japanese Patent Laid-Open No. 2018-165762).

In Japanese Patent Laid-Open No. 2017-140929, a technique is proposed in which the luminescence intensity of a display device is increased or the luminescent color is changed in accordance with the distance of the vehicle to an object around the vehicle (e.g., when a pedestrian approaches the vehicle in a predetermined distance or less). Also, in Japanese Patent Laid-Open No. 2018-165762, a technique is proposed for controlling display contents of an on-vehicle reporting device that is visible from the inside and outside the vehicle. Specifically, the display contents of the reporting device are switched between the presentation information for the inside of the vehicle and the presentation information for the outside of the vehicle based on a detection result regarding the presence of pedestrians around the vehicle and information regarding the traveling state of the vehicle.

Incidentally, when predetermined information is displayed in a display device that is visible to a pedestrian or a driver of another moving object that is present outside a moving object, there are cases where information is intended to be displayed to a person that is present in a specific direction from the moving object as the target, instead of persons that are present around the moving object in various directions therefrom.

SUMMARY OF THE INVENTION

The present disclosure has been made in consideration of the aforementioned issues, and realizes a technique with which, when information is presented in a display device provided in a moving object, information can be presented to a traffic participant in a specific direction from the moving object as the target, out of traffic participants around the moving object.

In order to solve the aforementioned problems, one aspect of the present disclosure provides a display control apparatus comprising: a display device that is a display device to be provided in a moving object that can travel, and outputs image information such that a visible direction from the outside of the moving object is restricted; one or more processors; and a memory storing instructions which, when the instructions are executed by the one or more processors, cause the display control apparatus to function as: a detection unit configured to detect an image information presentation target that is present around the moving object; and a control unit configured to control the visible direction in the display device to a predetermined direction, wherein the control unit controls the predetermined direction such that an output of the display device is visible to the image information presentation target detected by the detection unit.

Another aspect of the present disclosure provides, a moving object that can travel autonomously, comprising: a display device that is a display device to be provided in the moving object, and outputs image information such that a visible direction from the outside of the moving object is restricted; one or more processors; and a memory storing instructions which, when the instructions are executed by the one or more processors, cause the moving object to function as: a detection unit configured to detect an image information presentation target that is present around the moving object; and a control unit configured to control the visible direction in the display device to a predetermined direction, wherein the control unit controls the predetermined direction such that an output of the display device is visible to the image information presentation target detected by the detection unit.

Still another aspect of the present disclosure provides, a control method of a display control apparatus that includes a display device that is a display device to be provided in a moving object that can travel, and outputs image information such that a visible direction from the outside of the moving object is restricted, the control method comprising: detecting an image information presentation target that is present around the moving object; and controlling the visible direction in the display device to a predetermined direction, wherein, in the controlling, the predetermined direction is controlled such that an output of the display device is visible to the image information presentation target detected in the detecting.

Yet another aspect of the present disclosure provides, a non-transitory computer-readable storage medium storing a program for causing a computer to function as units of a display control apparatus, wherein the display control apparatus includes: a display device that is a display device to be provided in a moving object that can travel, and outputs image information such that a visible direction from the outside of the moving object is restricted; a detection unit configured to detect an image information presentation target that is present around the moving object; and a control unit configured to control the visible direction in the display device to a predetermined direction, wherein the control unit controls the predetermined direction such that an output of the display device is visible to the image information presentation target detected by the detection unit.

According to the present invention, when information is presented in a display device provided in a moving object, information can be presented to a traffic participant in a specific direction from the moving object as the target, out of traffic participants around the moving object.

BRIEF DESCRIPTION OF THE DRAWINGS

FIG. 2 is a diagram for describing an outline of display control processing according to the present embodiment.

FIG. 8 is a diagram illustrating an example of data in which the image information presentation target is associated with display contents, according to the present embodiment.

DESCRIPTION OF THE EMBODIMENTS

Figure 1:
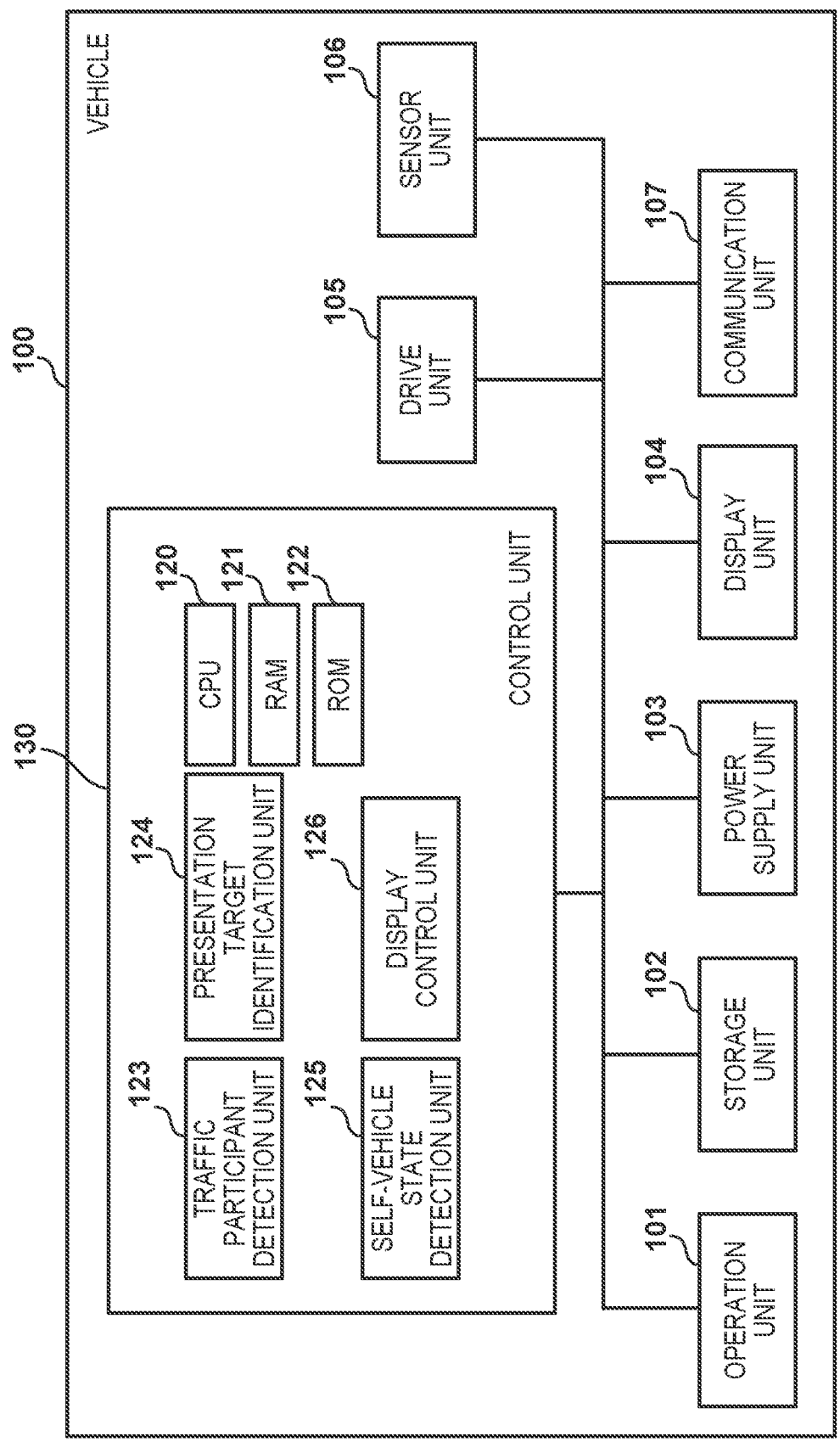
FIG. 1 is a block diagram illustrating an exemplary functional configuration of a vehicle serving as an example of a moving object according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiment, an example in which display control is performed in a moving object will be described, Note that, in the present embodiment, a case where the moving object is a four-wheel vehicle that can display information to the outside of the moving object will be described as an example. However, the moving object may include a two-wheel vehicle or a work vehicle including a snowplow vehicle that can display information to the outside. Also, a case where the vehicle according to the present embodiment is a vehicle that can travel autonomously without a driving operation made by a driver (also referred to as "automated driving") will be described as an example. That is, the driver that is on-board of a vehicle that travels autonomously is disengaged from driving, therefore other traffic participants can be notified of information, instead of the driver performing notification.

[Exemplary Functional Configuration of Vehicle]

An exemplary functional configuration of a vehicle serving as an example a moving object according to the present embodiment will be described with reference to FIG. 1. FIG. 1 illustrates an exemplary functional configuration of a vehicle 100. A control unit 130 is configured by being provided with at least one CPU 120, a RAM 121, and a ROM 122. The CPU 120, by reading out a computer program stored in the ROM 122 and executing the computer program, controls the units of the vehicle 100, and performs various types of control in the vehicle (e.g., control for autonomous traveling, display control according to the present embodiment). The ROM 122 is a storage medium including a nonvolatile semiconductor memory, for example, and stores programs for various types of processing. The RAM 121 is a storage medium including a volatile semiconductor memory, and is used as a work memory, for example. Note that, regarding the control unit 130, the entirety or a portion of the control unit 130 may be constituted by a GPU, an ASIC, a dedicated circuit, or the like.

The control unit 130 includes a traffic participant detection unit 123, a presentation target identification unit 124, a self-vehicle state detection unit 125, and a display control unit 126 that are used in later-described display control processing. The traffic participant detection unit 123 detects traffic participants based on image information from a later-described sensor unit 106, information from a LIDAR (Light Detection and Ranging), and the like.

The presentation target identification unit 124 identifies a specific traffic participant to which the vehicle 100 presents image information, out of the traffic participants around the vehicle 100, as an image information presentation target. For example, the presentation target identification unit 124 identifies the states of the traffic participants based on image information from the later-described sensor unit 106, information from a LIDAR (Light Detection and Ranging), and the like, and identifies a traffic participant that is in a specific state as the image information presentation target. The state of a traffic participant to be identified includes a state in which a pedestrian that is a traffic participant waits to pass through/across, in the vicinity of a predetermined position of a sidewalk (e.g., pedestrian crossing, intersection, position from which a road can be crossed), and a state in which a pedestrian passes across a pedestrian crossing. Also, the state of a traffic participant to be identified includes a state in which a specific vehicle that is a traffic participant waits for crossing in front of the vehicle 100 (at an intersection), and a state of the specific vehicle crossing the road at an intersection.

The self-vehicle state detection unit 125 detects the direction of the vehicle 100 based on a GPS signal from the later-described sensor unit 106 or the like. The display control unit 126 controls the display of an external display of the vehicle 100 based on the detection results and identification results of the traffic participant detection unit 123, the presentation target identification unit 124, and the self-vehicle state detection unit 125. Note that the details of the display control processing to be executed by the units of the control unit 130 will be described later.

An operation unit 101 is a part for accepting various operations regarding the vehicle, and includes a switch, a touch panel, and the like. The operation unit 101 accepts an operation for inputting a start and an end of driving by the driver and a navigation operation, for example, in the present embodiment.

A storage unit 102 includes a storage medium such as a hard disk, and temporarily stores various types of data from a sensor acquired by the later-described sensor unit 106. Also, the storage unit 102 may also store learned parameters (e.g., weight parameters of neural network) related to a machine learning algorithm (e.g., image recognition processing in detection processing of traffic participants) to be executed in the control unit 130. A power supply unit 103 is a part that supplies power to the units of the vehicle 100, and corresponds to a battery, for example.

A display unit 104 is a part for outputting, in the interior of the vehicle 100, various types of information such as an operation menu, a current location while in motion, and the like, and includes a display and the like. The display interior of the vehicle 100 (also referred to as an "interior display") may be a touch panel display, for example. Also, the display unit 104 includes a display device (also referred to as an "external display") that is provided outside the vehicle 100, and is visible to a traffic participant outside the vehicle 100. In the external display of the display unit 104, two different displays are arranged in a front face of the vehicle 100, for example, in the example of the present embodiment. One of the two external displays can output image information such that the visible direction from the outside of the vehicle 100 is restricted, for example. Also, the other external display can output image information without the visible direction from the outside of the vehicle 100 being restricted. That is, the image displayed in the other external display is visible from more directions than the external display in which the visible direction from the outside is restricted.

The external display in which the visible direction from the outside is restricted may be configured using a known technique. The external display includes a louver structure inside the display, for example. The external display controls the visible direction in a left and right direction of the vehicle 100 relative to the direction of the vehicle 100, by controlling the louver angle in the left and right direction. In the present embodiment, a case where the louver angle is controlled in the left and right direction relative to the direction of the vehicle 100 is described as an example, but the angle in an up and down direction (that is, a direction vertical to the left and right direction relative to the direction of the vehicle 100), or the angle in up, down, left, and right directions may be controlled. In the external display, light emitting elements of the display may be configured to be arranged in a louver structure shape. In this case, as a result of changing the louver angle, the display is visible from a specific direction, and viewing from some directions different from the specific direction is restricted. Also, the external display may be configured to include a film in which a fine louver shape is formed therein with which light traveling direction can be controlled, above the light emitting elements. The film allows light in the direction parallel to the louver to pass through, and does not allow (restricts) light in other directions to pass through, by controlling the louver angle, for example. Alternatively, the film may control the visible direction by configuring the film position to be movable relative to the display. The structure of the display that can control the visible direction is not limited to these examples, and other structures may be adopted as long as the visible direction is controllable.

A drive unit 105 is a part for the vehicle 100 to travel, and may include actuators, motors, an engine, and the like that are needed to control the traveling of the vehicle.

The sensor unit 106 includes various sensors for acquiring speed and acceleration of the vehicle 100, detecting traffic participants around the vehicle 100, and grasping the states thereof. The sensors may include a speed sensor, an acceleration sensor, an infrared sensor, a LIDAR, an image sensor, and the like, and the sensors may be provided in accordance with the information to be acquired. Also, the sensor unit 106 includes GPS (Global Positioning System) for detecting the location and direction of the vehicle 100.

A communication unit 107 is a part for performing communication with an external apparatus (e.g., external information processing seiner) through a mobile phone network, for example. The communication system may include inter-vehicle communication, WiFi communication, and the like, other than the mobile phone network. The communication unit 107 may transmit the acquired position information, travel data, and image information to an external information processing server, or may receive a map data, for example.

[Outline of Display Control Processing According to the Present Embodiment]

Next, the outline of display control processing in the vehicle 100 will be described with reference to FIGS. 2 to 4.

FIG. 2 illustrates an example of the display control processing in the vehicle 100 when the vehicle 100 that is driven automatically approaches a pedestrian crossing in which a signal is not present, on the path. FIG. 2 shows states at three timings according to the approaching state of the vehicle 100 and the states of traffic participants.

First, at a timing shown on a left side of FIG. 2, the vehicle 100 is approaching the pedestrian crossing, and a traffic participant (pedestrian 201) attempting to cross the pedestrian crossing is present on a sidewalk, and a traffic participant (pedestrian 202) is present at a position separated from the pedestrian crossing.

For example, at the timing shown on a left side of FIG. 2, the vehicle 100 detects the pedestrian 201 and the pedestrian 202. Also, the vehicle 100, upon identifying that the pedestrian 201 is a "specific traffic participant" in a specific state (e.g., state of the possibility that the pedestrian crosses the pedestrian crossing is high), controls the visible direction from the outside. For example, the vehicle 100 controls the display direction (e.g., louver angle) of the external display according to the angle 203 formed between a frontal direction of the vehicle 100 and the direction toward the specific traffic participant. The display in the external display is visible to the pedestrian 201 (specific traffic participant). As described above, regarding the visible direction of the external display 301, as a result of controlling the louver angle, for example, the display in the external display is visible from the direction of the pedestrian 201, but viewing from the direction of the pedestrian 202 (another traffic participant) is restricted. In this way, the vehicle 100 can present specific information to a specific traffic participant that is present in a direction toward a sidewalk adjacent to the traveling lane on which the vehicle 100 travels.

Figure 3:
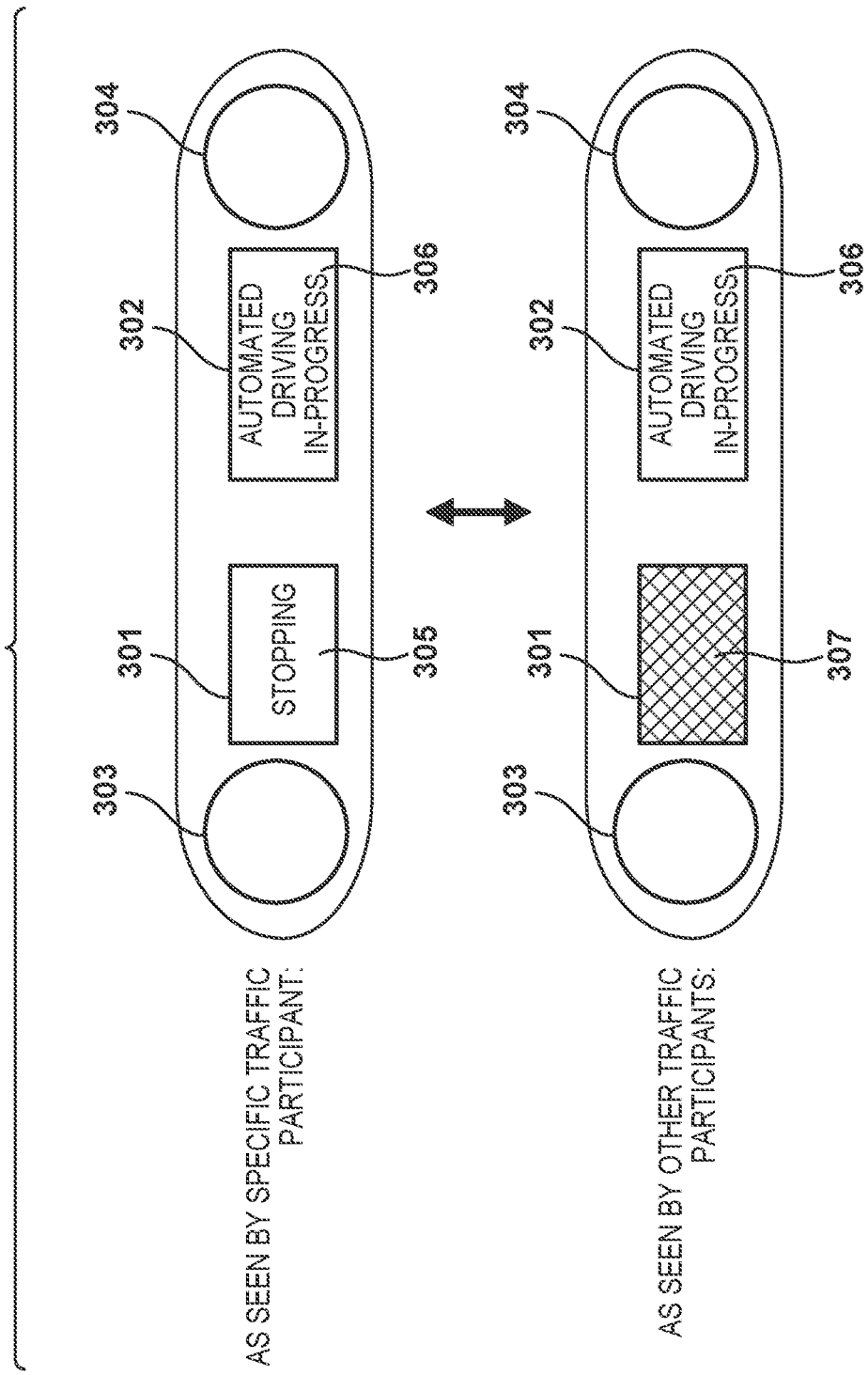
FIG. 3 is a diagram illustrating a configuration of a display device according to the present embodiment, and an example of how the display device appears to other traffic participants.

FIG. 3 shows a configuration of the external display in the vehicle 100, and an example of how the external display appears to other traffic participants. The vehicle 100 includes an external display 301 and an external display 302 that are visible from the outside, in the from face of the vehicle 100, as shown in FIG. 3. The external displays 301 and 302 are arranged between head lights 303 and 304.

In the example shown in FIG. 3, the external display 301 outputs image information in a direction visible to the pedestrian 201 that is a specific traffic participant, and the visible direction of the external display 301 is controlled to be a direction that is different from the frontal direction of the vehicle, for example. Here, the pedestrian 201 can view image information for the specific traffic participant that is displayed in the external display 301, that is, a message display 305 such as "Stopping", for example. On the other hand, when another traffic participant views the external display 301, viewing from a direction of the other traffic participant (pedestrian 202) is restricted due to the louver angle in the external display 301. Therefore, the pedestrian 202 cannot view the display in the external display 301 (the message display 305 is not visible, as shown in a display 307).

The external display 302 is arranged such that the display face is directed in the frontal direction of the vehicle, for example, and the visible direction is not restricted. Therefore, the image information displayed in the external display 302, e.g., a message display 306 such as "Automated Driving In-Progress" is visible to both of the specific traffic participant and another traffic participant.

For example, the image information output to the external display 301 is information indicating the behavior of the vehicle, and the image information output to the external display 302 is information indicating the state of the vehicle. That is, a specific traffic participant is notified of information for understanding the behavior of the moving object, and a general traffic participant is notified of the state of the moving object.

Next, at a timing shown in a central portion of FIG. 2, the vehicle 100 has further approached the pedestrian crossing and stopped. In this example, the relative angle between the vehicle 100 and the specific traffic participant (pedestrian 201) has changed. When the angle formed between the frontal direction of the vehicle 100 and the direction of the specific traffic participant has increased to an angle 204, for example, the vehicle 100 may change the visible angle from the outside by changing the louver angle in the external display 301. Also, when the visible angle from the outside is changed, the display in the external display 301 may also be changed. For example, the vehicle 100 changes the display of the external display 301 to a message display 401 such as "Stopped" according to the traveling state of the vehicle. Note that the vehicle 100 does not change the message display 306 displayed in the external display 302.

Moreover, at a timing shown on a right side of FIG. 2, the pedestrian 201 that is the specific traffic participant is shown as passing across the pedestrian crossing. Here, the vehicle 100 recognizes that the state of the specific traffic participant is changed from a waiting state (non-passing through/across state) to a passing through/across state, and changes the display of the external display 301 to a message display 402. The message display 402 is a message corresponding to the state of the specific traffic participant (passing through/across state in this example), "Take care" or the like is displayed.

Figure 5:
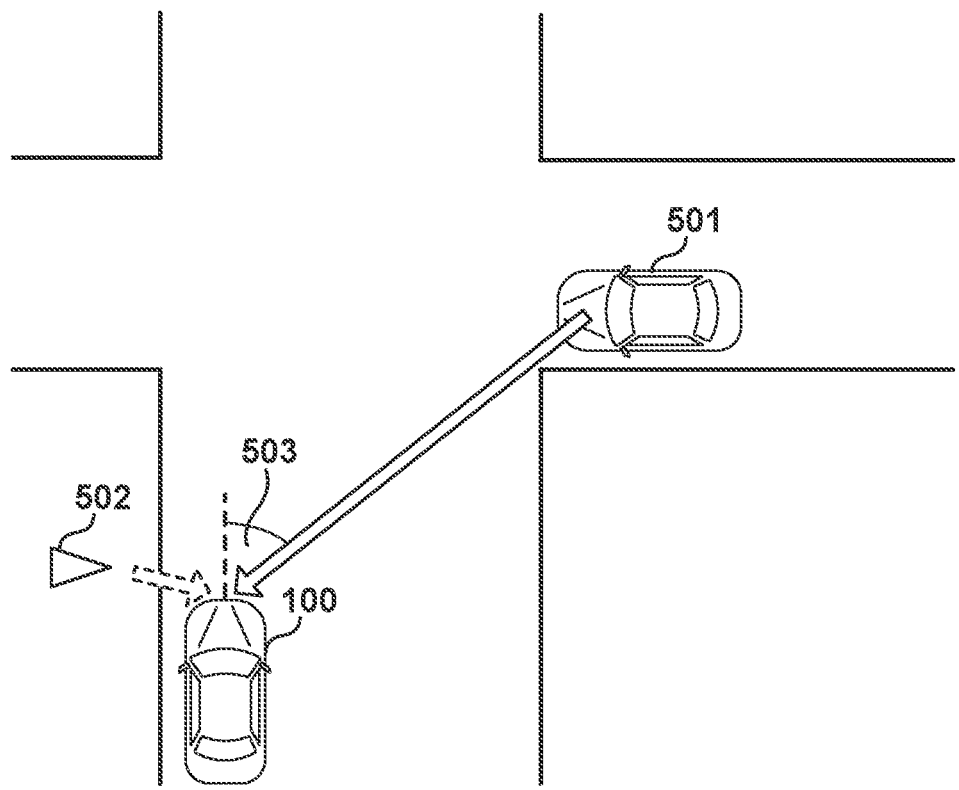
FIG. 5 is a diagram illustrating an example of using the display control processing according to the present embodiment regarding another moving object.

In the example described above, a case where the specific traffic participant is a pedestrian has been described as an example. However, an object that is identified as a specific traffic participant is not limited to a pedestrian. The specific traffic participant may also be a vehicle. For example, an example in which two vehicles are approaching to an intersection in which a signal is not present is shown in FIG. 5. In this example, a vehicle 100 is a vehicle that travels by automated driving, and a vehicle 501 is a vehicle that is driven by a driver. Also, a pedestrian 502 is present on a sidewalk of a road on which the vehicle 100 travels.

Figure 4:
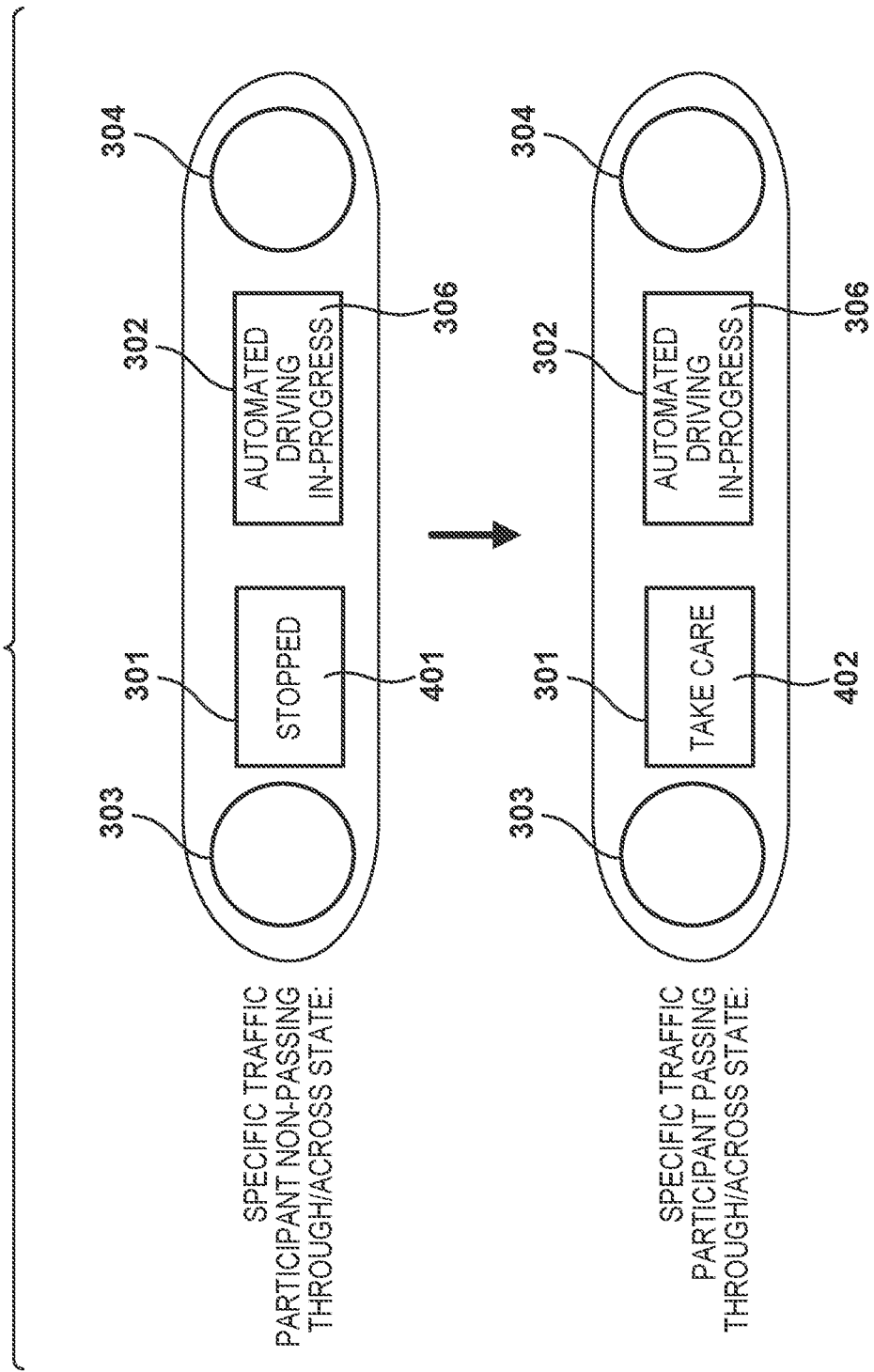
FIG. 4 is a diagram for describing an exemplary display of the display device according to the present embodiment.

In this example, the vehicle 100 performs display control with respect to the vehicle 501 that is a specific traffic participant by displaying the message display 305, message display 401, and message display 402 that are shown in FIGS. 3 and 4 in the external display 301. Here, the vehicle 100 can perform a message display to the vehicle 501, and restrict viewing of the message from the pedestrian 502 by controlling the louver angle in the external display 301, for example. The vehicle 100 may change the contents of the message display according to an angel 503 formed between the facing direction of the vehicle 100 and the direction of the vehicle 501.

In this way, when the vehicle 100 performs autonomous traveling, a message can be conveyed to a traffic participant, as the target, to which a manual-driving driver may indicate his/her intention.

[Series of Operations of Display Control Processing in Vehicle 100]

Figure 6:
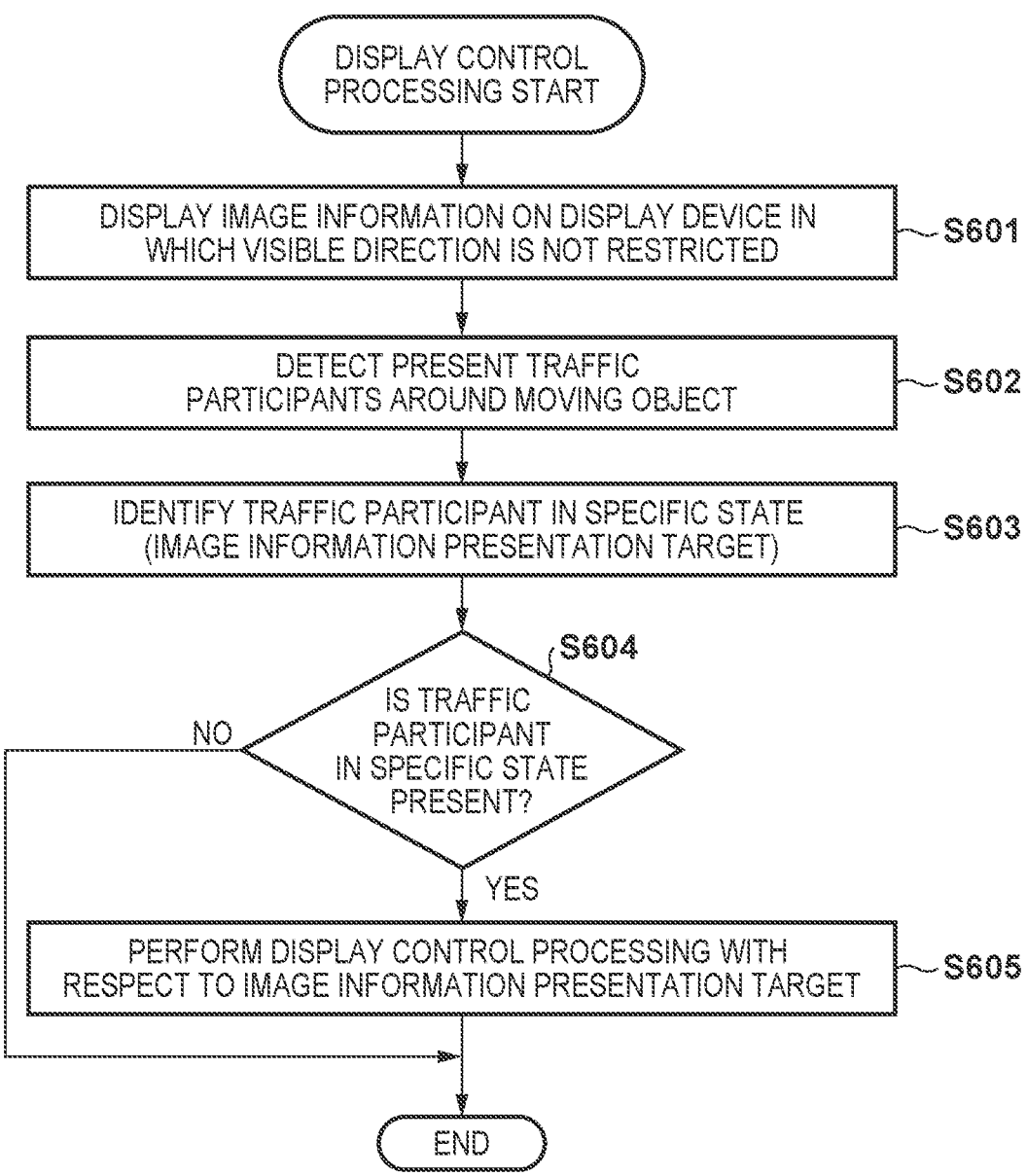
FIG. 6 is a flowchart illustrating a series of operations of the display control processing according to the present embodiment.

Next, a series of operations of the display control processing in the vehicle 100 will be described with reference to FIG. 6. Note that this processing is realized by the CPU 120 of the control unit 130 deploys a program recorded in the ROM 122 to the RAM 121, and executes the program to perform the operations of the units of the control unit 130, and the operations of the units of the vehicle 100. Also, this processing is started when the vehicle 100 travels by automated driving.

In step S601, the display control unit 126 of the control unit 130 displays a message in a display device (that is, external display 302) in which the visible direction is not restricted. In the example shown in FIG. 3, "Automated Driving In-Progress" is displayed in the external display 302.

In step S602, the traffic participant detection unit 123 of the control unit 130 detects traffic participants that are present around the vehicle. The traffic participant detection unit 123 detects traffic participants based on image information obtained by shooting forward of the vehicle 100, LIDAR information obtained by measuring forward of the vehicle 100, and the like that are obtained from the sensor unit 106, for example. For example, the traffic participant detection unit 123 may detect traffic participants by inputting the image information and a distance image of LIDAR to a trained CNN (convolutional neural network).

In step S603, the presentation target identification unit 124 of the control unit 130 identifies a traffic participant that is in a specific state (that is, image information presentation target). Specifically, the presentation target identification unit 124 determines whether or not a traffic participant detected in step S602 is in the specific state based on the image information obtained by shooting forward of the vehicle 100. Then, if it is determined that the traffic participant is in the specific state, the traffic participant is identified as the specific traffic participant. Regarding the state of the traffic participant, whether or not the traffic participant is in the specific state is determined by inputting image information obtained by shooting forward of the vehicle 100 to a trained CNN different from the CNN used in step S602. The presentation target identification unit 124, upon identifying the traffic participant that is in the specific state (image information presentation target), estimates the position information (absolute position, or a position relative to the vehicle 100) of the image information presentation target.

In step S604, the display control unit 126 of the control unit 130 determines whether a traffic participant that is in the specific state is present. The display control unit 126, if it is determined that a traffic participant that is in the specific state is present, advances the processing to step S605, and if not, ends the series of processing.

In step S605, the display control unit 126 of the control unit 130 performs display control processing with respect to the traffic participant in the specific state (image information presentation target). The display control processing with respect to the image information presentation target will be described later with reference to FIG. 7.

[Series of Operations of Display Control Processing with Respect to Image Information Presentation Target]

Figure 7:
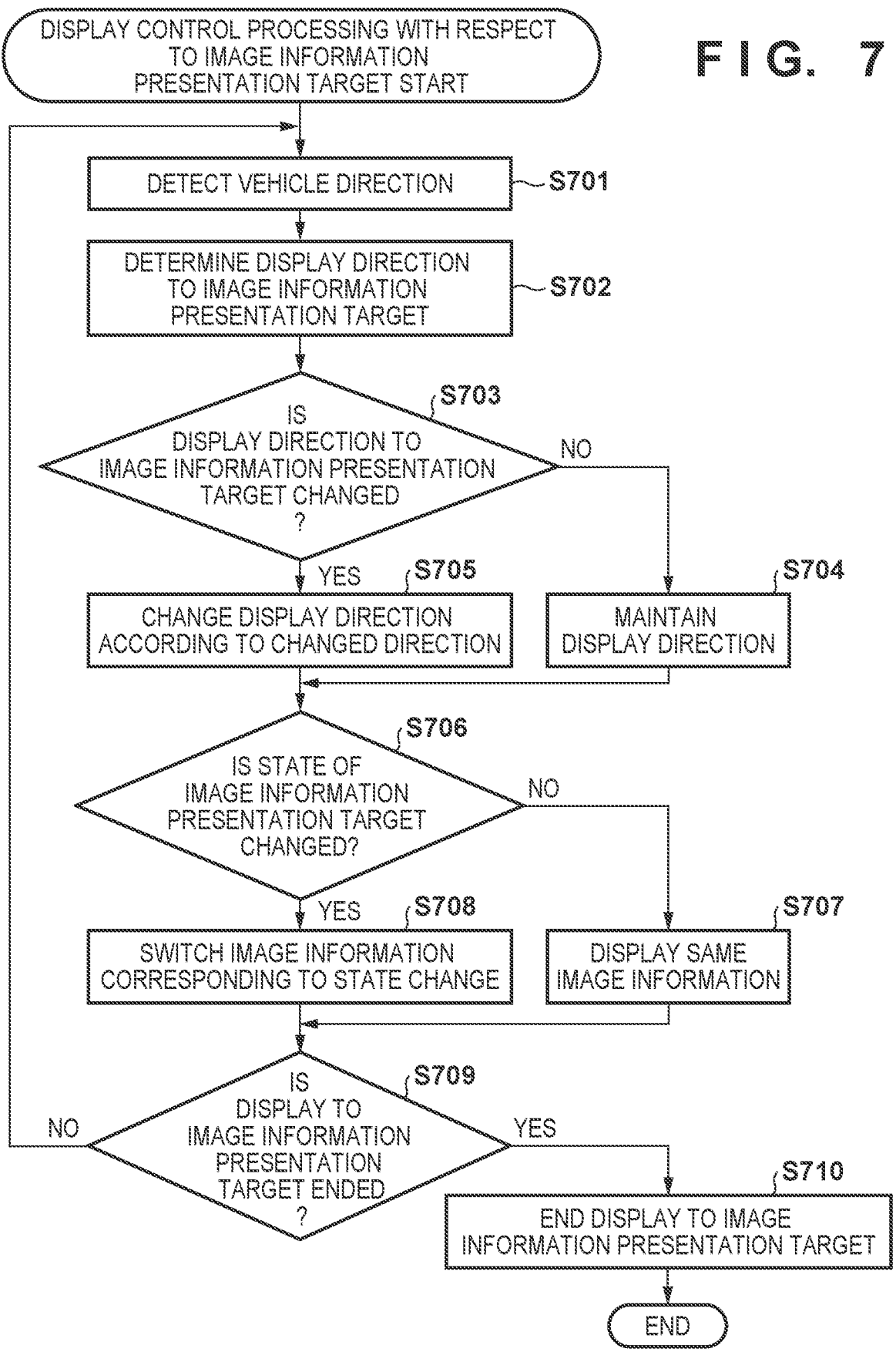
FIG. 7 is a flowchart illustrating a series of operations of the display control processing regarding an image information presentation target according to the present embodiment.

Next, the series of operations of display control processing with respect to the image information presentation target, in the vehicle 100, will be described with reference to FIG. 7. Note that this processing is realized by the CPU 120 of the control unit 130 deploys a program recorded in the ROM 122 to the RAM 121, and executes the program to perform the operations of the units of the control unit 130, and the operations of the units of the vehicle 100. Note that, in the following description, it is assumed that, in parallel to this processing, operations of the presentation target identification unit 124 for calculating the position of the image information presentation target and for identifying the state of the image information presentation target are repeatedly performed based on image information acquired at predetermined time intervals.

In step S701, the self-vehicle state detection unit 125 detects the frontal direction of the self-vehicle based on information of the GPS included in the sensor unit 106. In step S702, the display control unit 126 determines the display direction to the image information presentation target so as to be visible to the image information presentation target based on the position information of the image information presentation target calculated by the presentation target identification unit 124 and the frontal direction of the self-vehicle detected in step S701. The display direction to the image information presentation target corresponds to the angle 203 formed by the frontal direction of the vehicle 100 and the direction of the specific traffic participant, which has been described above in FIG. 2, and also corresponds to the louver angle of the external display 301.

In step S703, the display control unit 126 determines whether the display direction has changed by an angle larger than a predetermined angle by comparing the display direction to the image information presentation target that has been previously calculated and the display direction to the image information presentation target at this point in time. The reason why such determination is performed is because the display direction to the image information presentation target is to be changed in response to the change in position of the image information presentation target relative to the vehicle 100. In this way, when the vehicle 100 is approaching the image information presentation target, the image information presentation target will not be out of the visible range, for example. The display control unit 126, if it is determined that the display direction to the image information presentation target has changed, advances the processing to step S705, and if not, advances the processing to step S704.

In step S704, the display control unit 126 performs the next processing while maintaining the display direction of the external display 301. In step S705, the display control unit 126 changes the display direction of the external display (that is, the display direction to the image information presentation target) according to the display direction calculated in step S702.

In step S706, the display control unit 126 determines whether the state of the image information presentation target has changed based on the identification result of the presentation target identification unit 124. For example, the display control unit 126 determines whether the state of the image information presentation target has changed by comparing the state of the image information presentation target that has been previously calculated with the current state of the image information presentation target. Specifically, the display control unit 126 determines that the state has changed when the previous state of the image information presentation target is a non-passing through/across state shown in FIG. 2 and the current state of the image information presentation target is a passing through/across state. The display control unit 126, if it is determined that the state of the image information presentation target has changed, advances the processing to step S708, and if not, advances the processing to step S707. The reason why such determination is performed is because the image information is to be switched in response to the change in the specific state of the image information presentation target. In this way, the message display can be switched according to the state of the image information presentation target.

In step S707, the display control unit 126 keeps the same image information (e.g., image information indicating "Stopped" or the like) to be displayed in the external display 301. In step S708, the display control unit 126 switches the display of the external display 301 to a display of image information corresponding to the state after the state change. The switching of the image information can be performed based on a table in which the type of the image information presentation target, the state of the image information presentation target, and the image information to be displayed are associated. In this table, the type of the image information presentation target (column 801) shows that the image information presentation target is a pedestrian or a vehicle, as shown in FIG. 8, for example. Also, the state of the image information presentation target (column 802) shows that the image information presentation target is in a waiting state of passing across a pedestrian crossing (that is, non-passing through/across state), in a state of passing the pedestrian crossing (passing through/across state), or the like. The display information indicates information to be output to the external display 301 as image information. For example, in the case of another vehicle being in a state of waiting to pass through an intersection, image information "I Have Stopped. I Yield the Right of Way to You" is displayed. On the other hand, if a state is achieved in which the other vehicle is passing the intersection, nothing is displayed. It is to prevent a driver of the other vehicle from continuously viewing in a direction unnecessary for driving in order to understand the display contents.

In step S709, the display control unit 126 determines whether the display to the image information presentation target is to be ended. For example, it may be determined to end the display to the image information presentation target when a predetermined time has elapsed since the outputting of image information to the image information presentation target started. If the display to the image information presentation target is to be not ended, the processing is returned to step S701.

In step S710, the display control unit 126, if it is determined to end the display to the image information presentation target in step S709, ends the display to the image information presentation target, and returns the processing to the caller.

As described above, in the present embodiment, a display device that is provided in a vehicle that can travel and outputs image information such that visible direction from the outside of the vehicle is restricted is used. Also, an image information presentation target that is present around a moving object is detected, and the visible direction of the display device is controlled such that the output of the display device is visible to the detected image information presentation target. In this way, when information is presented in a display device provided in a moving object, the information can be presented to a traffic participant in a specific direction, out of traffic participants around the moving object, as a target.

(Modifications)

In the embodiment described above, a case where the traffic participant detection unit 123, the presentation target identification unit 124, and the display control unit 126 are realized in the control unit 130 has been described as an example. However, these function blocks may be executed in a server apparatus outside the vehicle 100. In this case, the vehicle transmits image information acquired from the sensor unit 106 and information regarding the state of the self-vehicle to the server apparatus via the communication unit 107. The server apparatus may perform the display control processing shown in FIGS. 6 and 7 based on the received information, and return the display contents of the external displays 301 and 302 and the information for controlling the direction to the vehicle 100. In this way, the weight of computing resources in the vehicle 100 can be reduced, and the processing utilizing the computing resources of the external server can be executed.

In the embodiment described above, a case where a traffic participant that is present in a certain direction is taken as the image information presentation target, in one display control processing, has been described. However, a plurality of traffic participants that are present in different directions may be taken as the image information presentation target, in one display control processing. For example, in the example shown in FIG. 2, not only the pedestrian 201, but also the pedestrian 202 can also be taken as the image information presentation target.

In this case, a configuration may be adopted in which the display control unit 126, using two display devices in which the visible direction from the outside is restricted, performs display such that the display devices are respectively assigned to image information presentation targets in different directions. That is, the external display 301 is constituted by a first display device and a second display device in each of which the visible direction is controllable. When a first image information presentation target and a second image information presentation target have been detected, the display control unit 126 controls the visible direction such that the output of the first display device is visible to the first image information presentation target. Also, the display control unit 126 controls the visible direction such that the output of the second display device is visible to the second image information presentation target. In this way, different pieces of image information can be presented to different image information presentation targets.

Alternatively, the display control unit 126 may, using only one display device in which the visible direction from the outside can be restricted, take traffic participants that are present in different directions as the image information presentation target. In this case, a first display state in which viewing from directions other than the direction of the traffic participant 201 is restricted and a second display state in which viewing from directions other than the direction of the traffic participant 202 is restricted may be alternatingly switched, for example. Here, moreover, if display contents that are different between the first display state and the second display state are output, the traffic participant 201 and the traffic participant 202 can view different displays.

Summary of Embodiment

1. A display control apparatus (e.g., 104, 130) of the embodiment described above include:

a display device (e.g., 104, 301) that is a display device to be provided in a moving object that can travel, and outputs image information such that a visible direction from the outside of the moving object is restricted;

a detection unit (e.g., 123, 124) configured to detect an image information presentation target that is present around the moving object; and a control unit (e.g., 126) configured to control a visible direction in the display device to a predetermined direction, wherein the control unit controls the predetermined direction such that an output of the display device is visible to the image information presentation target detected by the detection unit (steps S605, S704, and S705).

According to this embodiment, when information is presented in a display device provided in a moving object, the information can be presented to a traffic participant in a specific direction, out of traffic participants around the moving object.

2. In the embodiment described above, the control unit changes the predetermined direction in response to a change in position of the image information presentation target relative to the moving object (e.g., steps S704 and S705).

According to this embodiment, when the moving object is approaching the image information presentation target, it is possible that the image information presentation target will not be out of a visible range.

3. In the embodiment described above, the image information presentation target is a traffic participant (e.g., 201) that is present around the moving object, and is in a specific state.

According to this embodiment, display can be performed to an appropriate target that should be notified of the behavior of the vehicle.

4. In the embodiment described above, the traffic participant includes at least any of a pedestrian that is present in the vicinity of a predetermined position (e.g. pedestrian crossing or intersection) on a sidewalk, and a moving object that is present in the vicinity of an intersection.

According to this embodiment, a message can be conveyed to a traffic participant as the target to which a driver that performs manual driving may indicate his/her intention, when the vehicle 100 performs autonomous traveling.

5. In the embodiment described above, the image information is switched in response to a change in the specific state of the image information presentation target (e.g., step S708).

According to this embodiment, the message display can be switched in accordance with the state of the image information presentation target.

6. In the embodiment described above, the display device includes a first display device and a second display device in which the visible direction can be controlled, and when the detection unit has detected a first image information presentation target and a second image information presentation target, the control unit controls the visible direction such that an output of the first display device is visible to the first image information presentation target, and also controls the visible direction such that an output of the second display device is visible to the second image information presentation target.

According to this embodiment, different pieces of image information can be presented to different image information presentation targets.

7. In the embodiment described above, another display device that outputs image information without restricting the visible direction is further included, and the control unit controls the predetermined direction such that an output of the display device is visible to an image information presentation target detected by the detection unit while the other display device is outputting image information.

According to this embodiment, presentation of specific image information for an image information presentation target and display of general image information to traffic participants in a surrounding area can be performed at the same time.

8. In the embodiment described above, the display device includes a louver structure, and the control unit controls the visible direction in the display device to the predetermined direction by controlling a louver angle of the display device.

According to this embodiment, as a result of using a display including a louver structure, the visible direction can be controlled with a relatively simple configuration.

9. In the embodiment described above, the predetermined direction is a direction different from a frontal direction of the moving object, and the other display device is arranged such that a display face is directed in the frontal direction of the moving object.

According to this embodiment, the moving object can perform, while traveling on a traveling lane, an appropriate display to a pedestrian that is present on a sidewalk adjacent to the traveling lane.

10. In the embodiment described above, the predetermined direction is a direction toward a sidewalk adjacent to a traveling lane on which the moving object travels.

According to this embodiment, information visible to a pedestrian on a sidewalk adjacent to a traveling lane can be presented.

11. In the embodiment described above, image information output from the display device is information indicating a behavior of the moving object, and image information output from the other display device is information indicating a state of the moving object.

According to this embodiment, a specific traffic participant can be notified of information for enabling understanding of the behavior of the moving object, and a general traffic participant can be notified of the state of the moving object.

12. In the embodiment described above, the moving object can travel autonomously.

According to this embodiment, because a driver that is on-board of a vehicle that travels autonomously is disengaged from driving, other traffic participants can be notified of information instead of the driver performing notification.

The invention is not limited to the foregoing embodiments, and various variations/changes are possible within the spirit of the invention.

What is claimed is:

1. A display control apparatus comprising:
   a display device that is an external display device to be provided outside a moving object that can travel and is visible from the outside of the moving object, and outputs image information such that a visible direction from the outside of the moving object is restricted;
   one or more processors; and
   a memory storing instructions which, when the instructions are executed by the one or more processors, cause the display control apparatus to function as:
   a detection unit configured to detect an image information presentation target that is present around the moving object; and
   a control unit configured to control the visible direction in the display device to a predetermined direction,
   wherein the control unit controls the predetermined direction such that an output of the display device is visible to the image information presentation target detected by the detection unit.

2. The display control apparatus according to claim 1, wherein the control unit changes the predetermined direction in response to a change in position of the image information presentation target relative to the moving object.

3. The display control apparatus according to claim 1, wherein the image information presentation target is a traffic participant that is present around the moving object, and is in a specific state.

4. The display control apparatus according to claim 3, wherein the traffic participant includes at least any of a pedestrian that is present in the vicinity of a predetermined position on a sidewalk, and a moving object that is present in the vicinity of an intersection.

5. The display control apparatus according to claim 3, wherein the control unit switches the image information in response to a change in the specific state of the image information presentation target.

6. The display control apparatus according to claim 1,
   wherein the display device includes a first external display device and a second external display device in which the visible direction can be controlled, and
   when the detection unit has detected a first image information presentation target and a second image information presentation target, the control unit controls the visible direction such that an output of the first external display device is visible to the first image information presentation target, and also controls the visible direction such that an output of the second external display device is visible to the second image information presentation target.

7. The display control apparatus according to claim 1, further comprising: another external display device that outputs image information without restricting the visible direction,
   wherein the control unit controls the predetermined direction such that an output of the display device is visible to an image information presentation target detected by the detection unit while the other external display device is outputting image information.

8. The display control apparatus according to claim 7, wherein the display device includes a louver structure, and
   the control unit controls the visible direction in the display device to the predetermined direction by controlling a louver angle of the display device.

9. The display control apparatus according to claim 7, wherein the predetermined direction is a direction different from a frontal direction of the moving object, and
   the other display device is arranged such that a display face is directed in the frontal direction of the moving object.

10. The display control apparatus according to claim 9, wherein the predetermined direction is a direction toward a sidewalk adjacent to a traveling lane on which the moving object travels.

11. The display control apparatus according to claim 7, wherein image information output from the display device is information indicating a behavior of the moving object, and image information output from the other external display device is information indicating a state of the moving object.

12. The display control apparatus according to claim 1, wherein the moving object can travel autonomously.

13. A moving object that can travel autonomously, comprising:

a display device that is an external display device to be provided outside the moving object and is visible from the outside of the moving object, and outputs image information such that a visible direction from the outside of the moving object is restricted;

one or more processors; and a memory storing instructions which, when the instructions are executed by the one or more processors, cause the moving object to function as:

a detection unit configured to detect an image information presentation target that is present around the moving object; and a control unit configured to control the visible direction in the display device to a predetermined direction, wherein the control unit controls the predetermined direction such that an output of the display device is visible to the image information presentation target detected by the detection unit.

14. A control method of a display control apparatus that includes a display device that is an external display device to be provided outside a moving object that can travel and is visible from the outside of the moving object, and outputs image information such that a visible direction from the outside of the moving object is restricted, the control method comprising:

detecting an image information presentation target that is present around the moving object; and controlling the visible direction in the display device to a predetermined direction, wherein, in the controlling, the predetermined direction is controlled such that an output of the display device is visible to the image information presentation target detected in the detecting.

15. A non-transitory computer-readable storage medium storing a program for causing a computer to function as units of a display control apparatus, wherein the display control apparatus includes:

a display device that is an external display device to be provided outside a moving object that can travel and is visible from the outside of the moving object, and outputs image information such that a visible direction from the outside of the moving object is restricted;

a detection unit configured to detect an image information presentation target that is present around the moving object; and a control unit configured to control the visible direction in the display device to a predetermined direction, wherein the control unit controls the predetermined direction such that an output of the display device is visible to the image information presentation target detected by the detection unit.

16. A display control apparatus comprising:

a display device to be provided in a moving object that can travel, and outputs image information such that a visible direction from the outside of the moving object is restricted, wherein the display device includes a louver structure;

another display device that outputs image information without restricting the visible direction;

one or more processors; and a memory storing instructions which, when the instructions are executed by the one or more processors, cause the display control apparatus to function as:

a detection unit configured to detect an image information presentation target that is present around the moving object; and a control unit configured to control the visible direction in the display device to a predetermined direction by controlling a louver angle of the display device, wherein the control unit controls the predetermined direction such that an output of the display device is visible to the image information presentation target detected by the detection unit while the other display device is outputting image information.

* * * * *